United States Patent [19]

Mitsuda et al.

[11] Patent Number: 5,011,699

[45] Date of Patent: Apr. 30, 1991

[54] PROCESS FOR STERILIZING FOOD STUFFS

[75] Inventors: Hisateru Mitsuda, Kyoto; Hiroshi Ohminami, Nara; Haruko Nagasawa, Kyoto, all of Japan

[73] Assignee: Japan Food Industry Association Inc., Kyoto, Japan

[21] Appl. No.: 404,334

[22] Filed: Sep. 7, 1989

[51] Int. Cl.$^5$ ............... A23B 4/16; A23B 5/10; A23B 7/144

[52] U.S. Cl. ............... 426/320; 426/312; 426/327; 426/418; 426/532

[58] Field of Search ............... 426/320, 312, 326, 532, 426/327, 392, 418, 419

[56] References Cited

U.S. PATENT DOCUMENTS

| | | | |
|---|---|---|---|
| 3,897,210 | 7/1975 | Gruber et al. | 426/320 |
| 4,062,982 | 12/1977 | McMillan et al. | 426/320 |
| 4,411,921 | 10/1983 | Woodruff | 426/320 |
| 4,666,722 | 5/1987 | Creed et al. | 426/521 |
| 4,867,052 | 9/1989 | Cipelletti | 426/248 |

*Primary Examiner*—Donald E. Czaja
*Assistant Examiner*—D. Workman
*Attorney, Agent, or Firm*—John F. A. Earley; John F. A. Earley, III

[57] ABSTRACT

Food stuffs are sterilized in a processing room, packing receptacles or a refrigerator with the aid of a mixture of ozone gas and carbon dioxide gas and/or nitrogen gas. Packing receptacles are sealed after they have been filled up with the mixture. Equipments comprise a gas feed apparatus for feeding the mixture into the processing room or refrigerator and a gas control device for maintaining a fixed mixing ratio of ozone gas to carbon dioxide gas and/or nitrogen gas.

4 Claims, 3 Drawing Sheets

PROCESS FOR STERILIZING FOOD STUFFS

BACKGROUND OF THE INVENTION

This invention relates to a process for sterilizing food stuffs and an equipment therefor, a process for packing and sterilizing food stuffs and packing receptacles therefor and a process for sterilizing and freezing food stuffs and an equipment therefor. Food stuffs mentioned here mean edible products which have to be sterilized because of public health.

Previously, various processes were used to sterilize food stuffs, and a process for sterilizing food stuffs with the aid of ozone was a typical one of the processes. In the typical process, an ozone solution, which has been produced by bubbling water with ozone gas, was used to preserve, for example, fishes, fresh vegetables which have been cut etc., while ozone gas was used to sterilize vegetables, fruits etc. The process with the aid of the ozone solution was superior to the process with the aid of ozone gas, because the former had stronger germicidal force than the latter, and because the ozone solution was permeable to the inside of food stuffs.

However, in the process with the aid of the ozone solution the ozone solution was directly in contact with the food stuffs, and as a result, there was a problem that the food stuffs to be treated should be limited. On the other hand, in the process with the aid of ozone gas its germicidal force was weak, with the result that it was necessary to increase the density of ozone. Since the force of permeation of ozone gas little, only the surface of food stuffs could be sterilized, and since the force of oxidation of ozone in high density was strong, the food stuffs changed color and emitted an offensive smell. Accordingly, there was a problem that the process with the aid of ozone gas was hampered by a lot of restrictions.

SUMMARY OF THE INVENTION

The present invention aims at improving the foregoing process and at solving the above-mentioned problems.

To achieve the above-mentioned objects, the first invention provides a process for sterilizing food stuffs, which is characterized by the steps of putting food stuffs in a processing room and feeding a mixture of ozone gas and an inert gas or gases (carbon dioxide gas and/or nitrogen gas) into the processing room whereby to sterilize the food stuffs.

The second invention provides an equipment for sterilizing food stuffs, which is to carry out the process of the first invention, and which comprises a processing room in which food stuffs are put in, a gas feed apparatus for feeding a mixture of ozone gas and an inert gas or gases (carbon dioxide gas and/or nitrogen gas) into said processing room whereby to sterilize the food stuffs and a gas control device for maintaining a fixed mixing ratio of ozone gas and the inert gas or gases.

The third invention provides a process for packing sterilizing food stuffs, which is characterized by the steps of putting food stuffs in packing receptacles (made of plymer, metal etc.) which is not air-permeable and sealing said packing receptacles after filling up the packing receptacles with a mixture of ozone gas and an inert gas or gases (carbon dioxide gas and/or nitrogen gas) whereby to sterilize the food stuffs which have been packed in.

The fourther invention provides packing receptacles for packing and sterilizing food stuffs, which are to carry out the process of the third invention, and which are characterized in that said packing receptacles (made of polymer, metal etc.) are not air-permeable, and that the packing receptacles are sealed after they have been filled up with a mixture of ozone gas and an inert gas or gases (carbon dioxide gas and/or nitrogen gas).

The fifth invention provides a process for sterilizing and freezing food stuffs, which is characterized by the steps of putting food stuffs in a refrigerator and feeding a mixture of ozone gas and an inert gas or gases (carbon dioxide gas and/or nitrogen gas) into the refrigerator whereby to freeze the food stuffs after the food stuffs have been sterilized.

The sixth invention provides an equipment for sterilizing and freezing food stuffs, which is to carry out the process according to the fifth invention, and which comprises a refrigerator to produce frozen foods, a gas feed apparatus for feeding a mixture of ozone gas and an inert gas or gases (carbon dioxide gas and/or nitrogen gas) into said refrigerator whereby to sterilize the food stuffs and a gas control device for maintaining a fixed mixing ratio of ozone gas and the inert gas or gases whereby to freeze the food stuffs after they have been sterilized.

In the process and equipment for sterilizing food stuffs, which are constituted as mentioned above, ozone gas and the inert gas or gases are mixed in various ratios, and the mixing ratios are mainteinted as they are fixed. Thus, a synergetic effect of the sterilization function of the ozone gas and the sterilization and deoxidation functions of the inert gas or gases can be obtained. For example, carbon dioxide gas, as inert gas, has a sterilization function, and besides, it has such a nature that the function influences the inside of objects to be sterilized. This can compensate a defect of ozone gas which sterilizes only the surface of the objects. Also, nitrogen gas, as an inert gas, can prevent the food stuffs from changing color and from emitting an offensive smell, owing to the surplus oxidation function of ozone gas. Accordingly, it is possible to obtain a high efficiency of the sterilization without harmful influence, as compared with the sterilization with the aid of ozone gas.

In the process and packing receptacles for packaging and sterilizing food stuffs according to the invention, the foregoing process for sterilizing food is used. The food stuffs are put in the packing receptacles which are not air-permeable, and the packing receptacles are sealed after they have been filled up with a mixture of ozone gas and the inert gas or gases. This enables food stuffs to be sterilized after thay have been packed.

In the process and equipment for freezing and sterilizing food stuffs according to the invention the foregoing process for sterilizing food stuffs is used. The food stuffs are put in the refrigerator, and a mixture of ozone gas and an inert gas or gases are fed into the refrigerator. Then, the food stuffs are frozen after they have been sterilized. This enables the number of becteria at the first stage to be reduced and the second pollution to be prevented.

BRIEF DESCRIPTION OF THE DRAWINGS

The drawings show examples of the present invention.

DETAILED DESCRIPTION OF THE INVENTION

EXAMPLE 1

Figure 1:
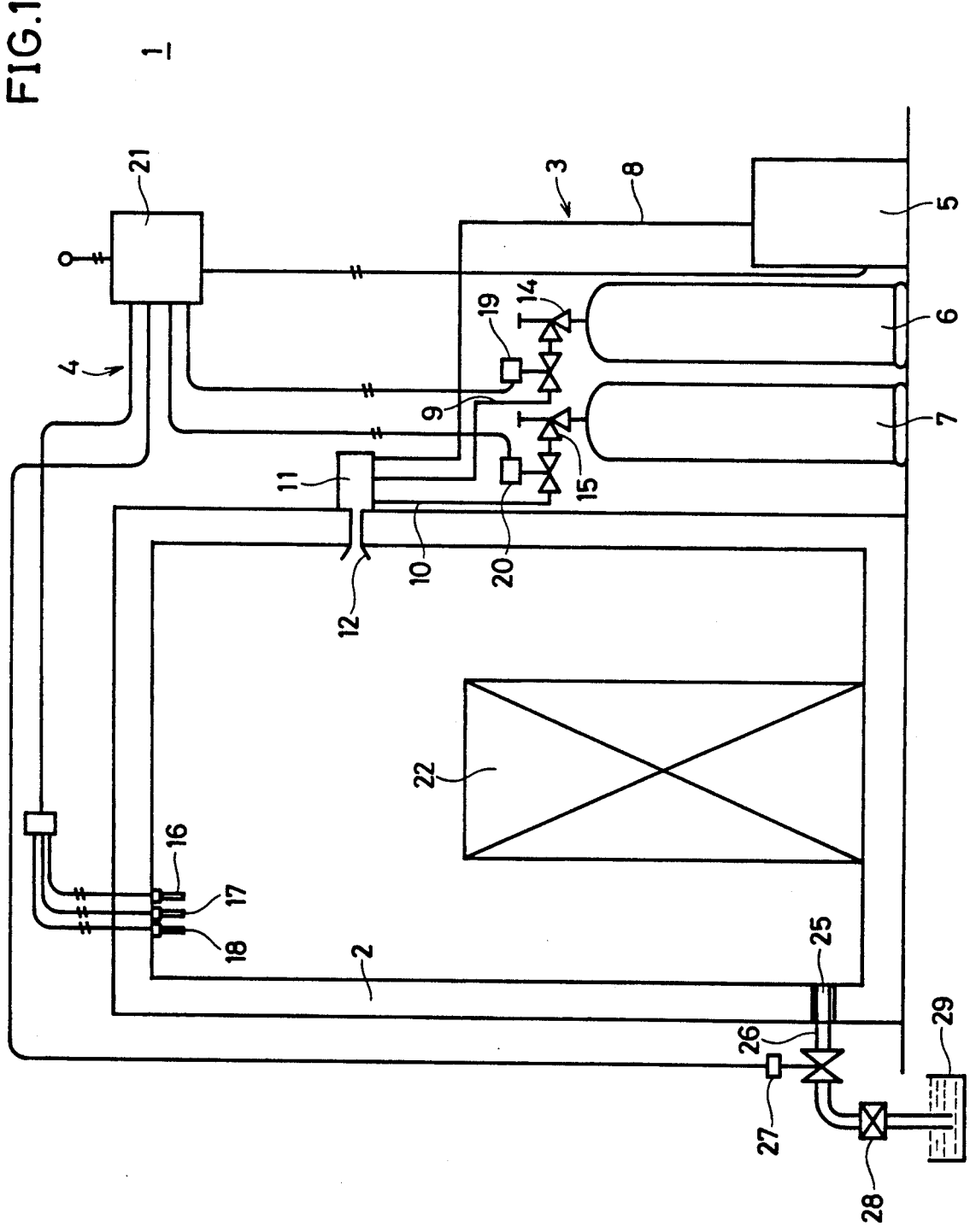
FIG. 1 is a partially sectioned front view of an equipment for sterilizing food stuffs according to Example 1.

This example relates to a process and an equipment for sterilizing food stuffs, in which carbon dioxide gas and nitrogen gas are used as an inert gas. In FIG. 1, numeral 1 indicates an equipment for sterilizing food stuffs according to this example, and a gas feed apparatus 3 and a gas control device 4 are arranged at the outside of processing room 2. The gas feed apparatus 3 is provided with an ozonizer 5, a carbon dioxide gas bumb 6 and a nitrogen gas bumb 7. The ozonizer 5 and the gas bumbs 6 and 7 are connected with gas feed pipes 8, 9 and 10, and respective terminal ends of the gas feed pipes 8, 9 and 10 are connected with a mixing box 11, from which an injection nozzle 12 is opened into the processing room 2. Numerals 14 and 15 indicate stop valves which are respectively secured to the gas bumbs 6 and 7. The gas control device 4 is provided to maintain a fixed mixing ratio of carbon dioxide gas and nitrogen gas, and three gas density sensors 16, 17 and 18 and two electromagnetic valves 19 and 20 are connected with a control panel 21. The gas sensors 16, 17 and 18 are arranged at the surface of ceiling of the processing room 2 detect the density of ozone gas, carbon dioxide gas and nitrogen gas respectively and to send values, which they have detected, to the control panel 21 as electrical signals. The electromagnetic valves 19 and 20 are provided on the way of the gas feed pipes 8 and 9 respectively to open and close the gas feed pipes 8 and 9 of the carbon dioxide gas bumb 6 and the nitrogen bas bumb 7. The control panel 21 is also connected with the ozonizer 5, and it receives electrical signals from the gas density sensors 16, 17 and 18 to control automatically the operation of the ozonizer 5 and the openning and closing operation of the electromagnetic valves 19 and 20. Besides, the processing room 2 is provided with a gas outlet 25 which is connected with a pipe 26. The pipe 26 is connected on the way with an electromagnetic valve 27 controlled by the control panel 21 and an ozone resolving apparatus 28, and it is opened under water in a water tank 29.

To sterilize food stuffs 22 in the equipment 1, which is constituted as mentioned above, the food stuffs 22 are put in the processing room 2, and then, ozone gas and carbon dioxide gas are injected into the processing room 2 from the carbon dioxide gas bumb 6 and the nitrogen gas bumb 7. At that time, the control panel 21 receives electrical signals regarding the density of respective gases in the processing room 2 from the gas density sensors 16, 17 and 18, and it controls the ononizer 5 and electromagnetic valves 19 and 20 to maintain a fixed ratio of a mixture of the gases. In the processing room 2, ozone gas sterilizes the surface of the food stuffs 22, and carbon dioxide gas sterilizes the inside of the food stuffs 22. Also, the function of deoxidation of nitrogen gas controls the function of oxidation of ozone gas, whereby to prevent the food stuffs 22 from changing color and from emitting an offensive smell. After the sterilizing treatment has been completed, air, ozone gas and the inert gases in the processing room 2 pass the ozone resolving apparatus 28, and they are discharged into the air through an opened end of the pipe 26 in the water tank 29.

EXAMPLE 2

Figure 2:
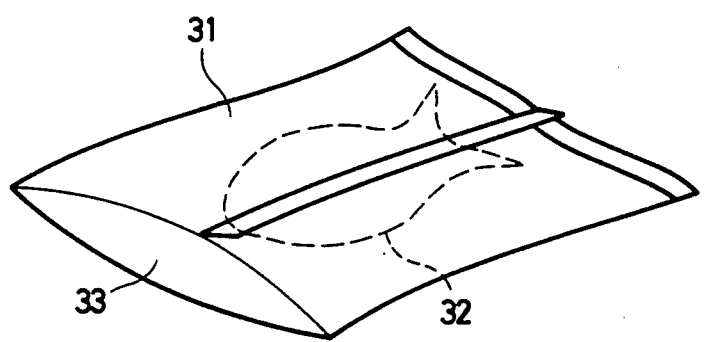
FIG. 2 is a perspective view of a packing receptacle for packing and sterilizing food stuffs according to Example 2.

This example relates to a process and packing receptacles for packing and sterilizing food stuffs. In FIG. 2, numeral 31 indicates a packing receptacle according to the example, which has been made of a plastic film which is not air-permeable. When food stuffs 32 are to be sterilized after they have been packed by means of the packing receptacle 31, the packing receptacle 31 is formed in the shape of a bag having an opening 33 at its end, and then, the food stuffs 32 is put in the receptacle. After the bag has been filled with a mixture of ozone gas, carbon dioxide gas and nitrogen gas, which have a fixed ratio of their density, the opening 33 is sealed by means of melting for example. In the receptacle 31, as in example 1, ozone gas and carbon dioxide gas sterilize the surface and the inside of the food stuffs 32, while nitrogen prevent the food stuffs 32 from changing color and from emitting an offensive smell. Furthermore, previously, in case of food stuffs being perishable foods or processed foods, chemical disinfectants were used to sterilize and disinfect them. However, it now is possible to sterilize and pack the food stuffs safely without influencing the human body, providing that the mixture of gases according to the invention is used.

EXAMPLE 3

Figure 3:
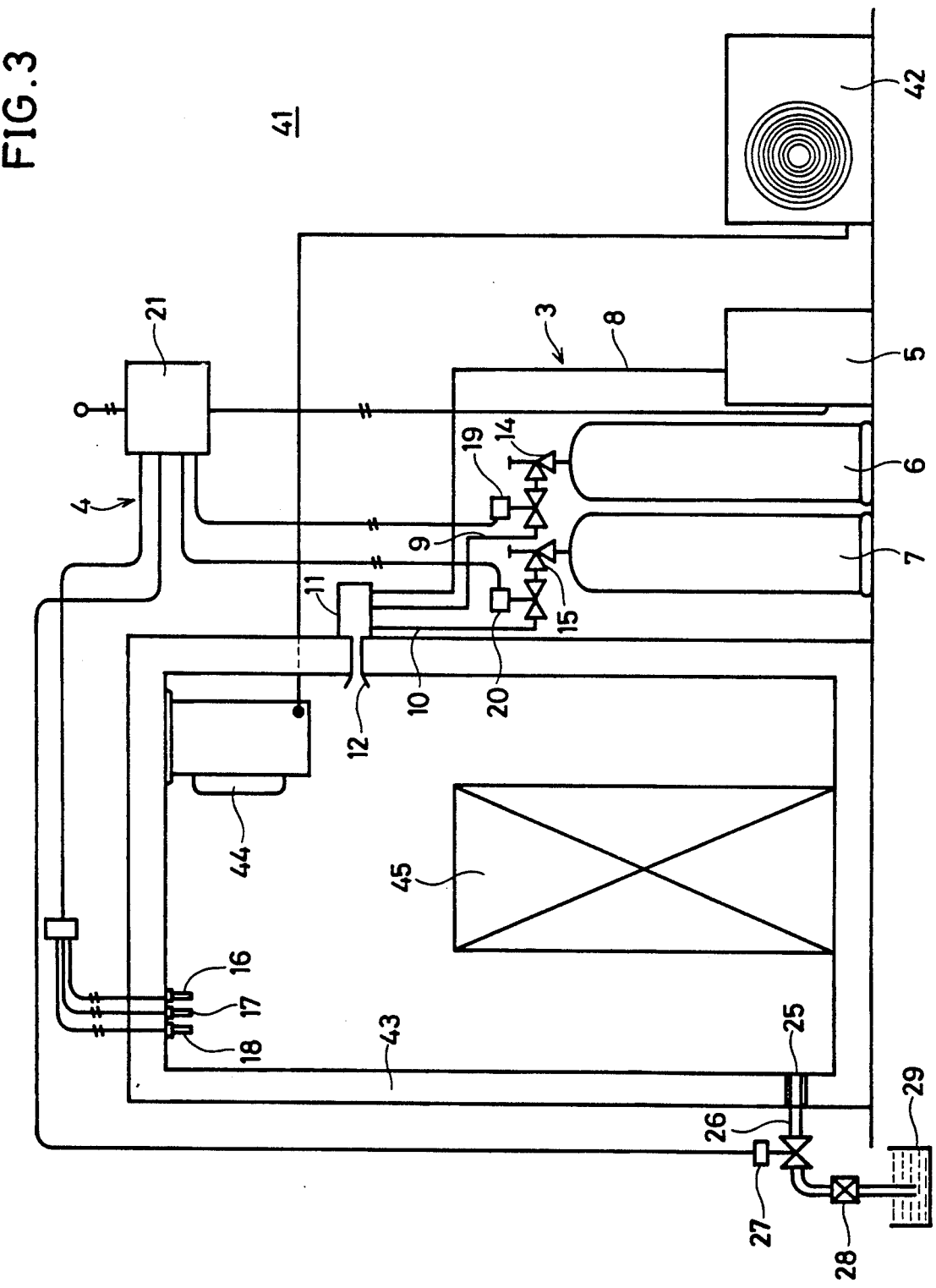
FIG. 3 is a partially sectioned front view of an equipment for sterilizing and freezing food stuffs according to Example 3.

This example relates to a proccess and equipment for sterilizing and freezing food stuffs, and in the example carbon dioxide gas and nitrogen gas are used as inert gases. In FIG. 3, numeral 41 indicates an equipment for sterilizing and freezing food stuffs according to the example, and a gas feed apparatus 3 and a gas control device 4 are arranged outside of a refrigerator 43, as in the equipment in FIG. 1. Numeral 44 indicates a cooling unit apparatus, which is arranged at the ceiling of the refrigerator 43, and which cools gases in the refrigerator 43. Further, respective parts of the gas feed apparatus 3 and the gas control device 4 are indicated with the same numerals as those in FIG. 1.

When food stuffs 45 are to be frozen and sterilized in the equipment 41, the food stuffs 45 are put in the refrigerator 43, and ozone gas, carbon dioxide gas and nitrogen gas are respectively injected into the refrigerator 43 from an ozonizer 5, a carbon dioxide gas bumb 6 and a nitrogen gas bumb 7. Then, a control panel 21 receives electrical signals regarding the density of the gases in the refrigerator 43 from gas density sensors 16, 17 and 18, and it controls the ozonizer 5 and electromagnetic valves 19 and 20 to maintain a fixed mixing ratio of the gases. In the refrigerator 43, ozone gas and carbon dioxide gas sterilize the surface and the inside of the food stuffs 45, while nitrogen gas prevents the food stuffs 45 from changing color and from emitting an offensive smell.

After the food stuffs 45 have been sterilized, as mentioned above, the refrigerant from a refrigerating machine 42 is sent to a cooling unit 44. which cools air and gases in the refrirator 43 to refrigerate the food stuffs 45. After the sterilizing and freezing treatments have been completed, air, ozone gas and the inert gases pass the ozone resolving apparatus 28 and are discharged into the air through an opened end of the pipe 26 in the water tank 29. In this example, since the food stuffs 45 are frozen soon after they have been sterilized, it is possible to reduce the number of bacteria at the first stage, and also it is possible to prevent second contamination.

In the three examples mentioned above, the mixing ratio of ozone gas and an inert gas or gases should be set as respective appropriate values according to the kind of food stuffs, and in case of some kinds of food stuffs, it is possible to use separately carbon dioxide gas or nitrogen gas.

In connection with Example 2, a test which the inventor has carried out to examine the effect of sterilization in the process for packing and sterilizing food stuffs according to the invention is explained hereinafter.

In the test, samples of an agar in the shape of a plate were prepared in accordance with so-called a method of mixing and dilution, and the samples were put in receptacles, which were in the shape of a bag, and which were made of a film having no air-permeability. The opening of each of the receptacles was sealed to the extent of 80 percent of it, and then, the opening was completely sealed, after the receptacles had been filled with gases under the conditions as shown in the following table. After 48 hours cultivation at a suitable temperature, the number of colibacillus of each of the samples was measured. The data of the measurement are shown in the following table.

| Samples | Kind of gas and Mixing ratio (in weight) | | Number of cobibacillus |
|---|---|---|---|
| 1 | no treatment | | 485 |
| 2 | ozone gas only | | 126 |
| 3 | carbon dioxide gas only | | 221 |
| 4 | ozone gas 1 | carbon dioxide gas 1 | 30 |
| 5 | ozone gas 1 | carbon dioxide gas 2 | 0 |
| 6 | ozone gas 1 | carbon dioxide gas 3 | 5 |
| 7 | ozone gas 2 | carbon dioxide gas 1 | 1 |
| 8 | ozone gas 3 | carbon dioxide gas 1 | 54 |

As seen from the table, the effect of sterilization of ozone gas, which was mixed with carbon dioxide gas, was higher than that of ozone gas which was not mixed with carbon dioxide gas. The reason why the effect was higher was that the mixture of ozone gas and carbon dioxide gas can sterilize the surface and the inside of the food stuffs at the same time. Most desirable results were obtained, when the mixing ratio of ozone gas and carbon dioxide gas was between 1 to 2 and 2 to 1. In addition, the number of the coilibacillus in case of carbon dioxide gas being used separately was greater than that in case of ozone gas being used separately, and the size of collonies of the colobacillus in case of carbon dioxide gas being used separately was smaller than that in case of ozone gas being used separately. Furthermore, the collonies in case of ozone gas being used separately were found in the inside of the samples.

Another test has been carried out to examine the effect of the process for packing and sterilizing food stuffs acconding to the invention, wherein nitrogen gas was used as an inert gas and raw beef was packed and sterilizied.

After the sterilization, the raw beef was preserved for a day at 5° C., and then, TBA value was measured to examine to what extent fat of the beef had been oxidized. According to the test, it was seen that the TBA value in case of ozone gas being used separately was two times as that of the raw beef. Also, it was seen that the TBA value was decreased as the mixing ratio of nitrogen gas relative to ozone gas was increased. When the mixing ratio of nitrogen gas relative to ozone gas was 1 to 1, The TBA value was controlled to be 60 percent of that in case of ozone gas being used separately.

The same measurement was carried out after the process in which carbon dioxide gas was used separately as an inert gas. It was seen that the TBA value in case of ozone gas being used separately was two times that of the raw beef. When the mixing ratio of carbon dioxide gas relative to ozone gas was increased, the TBA value was decreased. Also, when the mixing ratio of ozone gas relative to carbon dioxide gas was 1 to 1, the TBA value was controlled to be 70 percent of that in case of ozone gas being used separately.

As mentioned above, since ozone gas is used with an inert gas or gases in the process according to the present invention, a synergetic effect of the effect of sterilization of ozone gas and the effect of sterilization and deoxidization of the inert gas or gases can be obtained. For example, if carbon dioxide gas is used as the inert gas, it sterilizes the inside of the food stuffs, when ozone gas sterilizes the surface of the food stuffs at the same time. Also, if nitrogen gas is used as an inert gas, it prevents deterioration of the food stuffs due to the excessive oxidation of ozone gas, and it prevent the food stuffs from changing color and from emitting an offensive smell. Accordingly, it is possible to obtain higher effect of the sterilization than that in case of ozone gas being used separately, and also it is possible to obtain the effect of sterilization without harmful influence.

Besides, according to the above-mentioned process it is possible to sterilize food stuffs, after the food stuffs have been packed, providing that the food stuffs are packed in packing receptacles, which are not air-permeable, and providing that the packing receptacles are sealed after they have been filled up with ozone gas and the inert gas. Since chemical disinfectants are not used in the process, it is possible to sterilize and pack food stuffs safely without influencing the buman body.

Futhermore, according to the above-mentioned process it is possible to reduce the number of bacteria in frozen food stuffs at the first stage and to prevent second contamination of the frozen food stuffs.

We claim:

1. A process for sterilizing food stuffs comprising the steps of
    putting the food stuffs in a processing room, and
    feeding a mixture of ozone gas and carbon dioxide gas into said processing room to sterilize the food stuffs, said mixture having a mixing ratio in weight of carbon dioxide gas to ozone gas ranging from 2 to 1 through 1 to 2.

2. The process for sterilizing food stuffs as claimed in claim 1, further including the step of feeding nitrogen gas into the processing room with the mixture of ozone gas and corbon dioxide gas.

3. A process for sterilizing and freezing food stuffs comprising the steps of
    putting food stuffs in a refrigerator,
    feeding a mixture of ozone gas and carbon dioxide gas into said refrigerator to sterilize the food stuffs, said mixture having a mixing ratio in weight of carbon dioxide gas to ozone gas ranging from 2 to 1 through 1 to 2, and
    freezing the food stuffs after the food stuffs have been sterilized.

4. The process for sterilizing and freezing food stuffs as claimed in claim 3, further including the step of
    feeding nitrogen gas into the refrigerator with the mixture of ozone ga and carbon dioxide gas.

* * * * *